Sheet 1 2 Sheets.

M. H. Furguson,
Grinding Mill.

Nº 29,961.      Patented Sep. 11. 1860.

Sheet 2—2 Sheets.

M. H. Furguson,
Grinding Mill.

Nº 29,961.      Patented Sep. 11, 1860.

UNITED STATES PATENT OFFICE.

M. H. FERGUSON, OF SUNFISH, OHIO.

FEEDING GRAIN TO MILLS.

Specification of Letters Patent No. 29,961, dated September 11, 1860.

*To all whom it may concern:*

Be it known that I, MARSHALL H. FERGUSON, of Sunfish, in the county of Monroe and State of Ohio, have invented certain new and useful Improvements in the Manner of Feeding in Grain to the Burs of Grinding-Mills; and I do hereby declare the following to be a full, clear, and exact description of the same, reference being had to the accompanying drawings, making a part thereof, in which—

Figure 1:
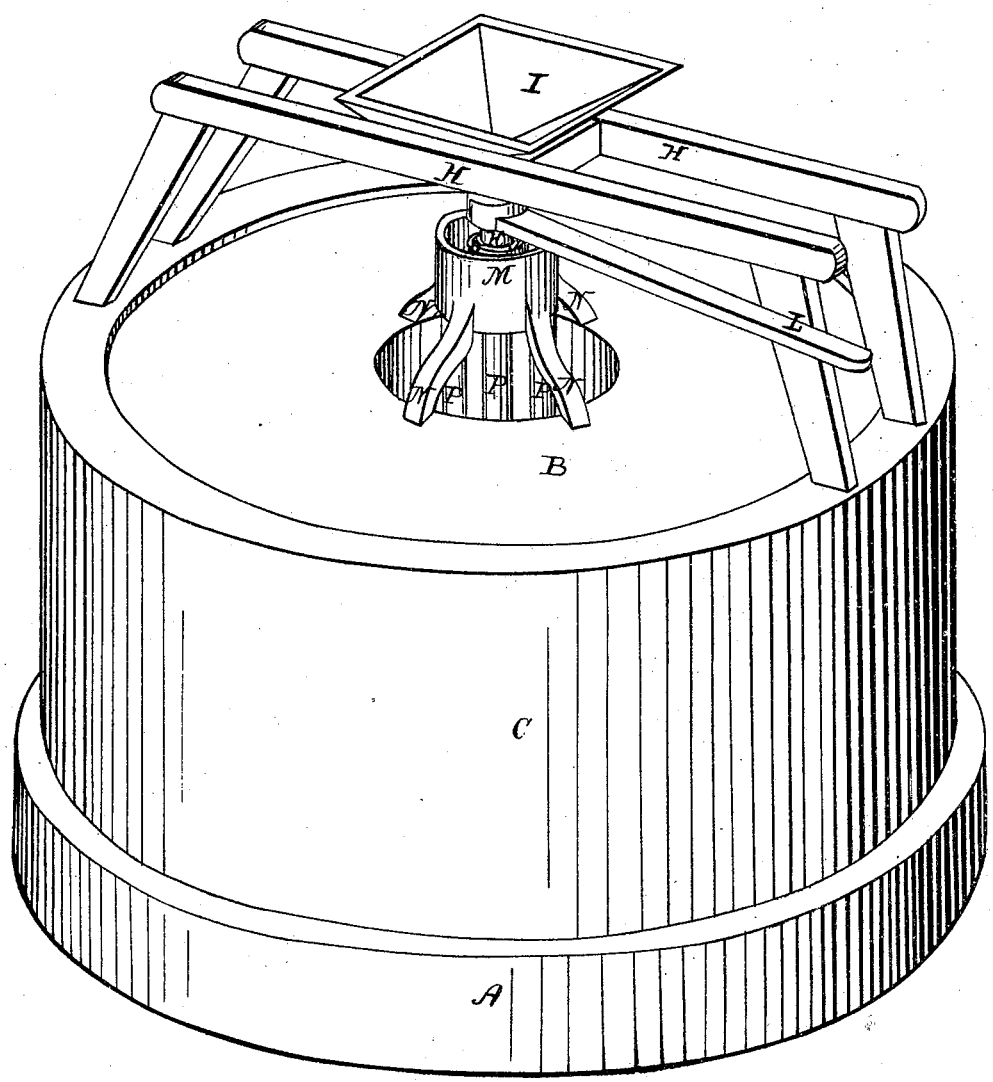
Figure 2:
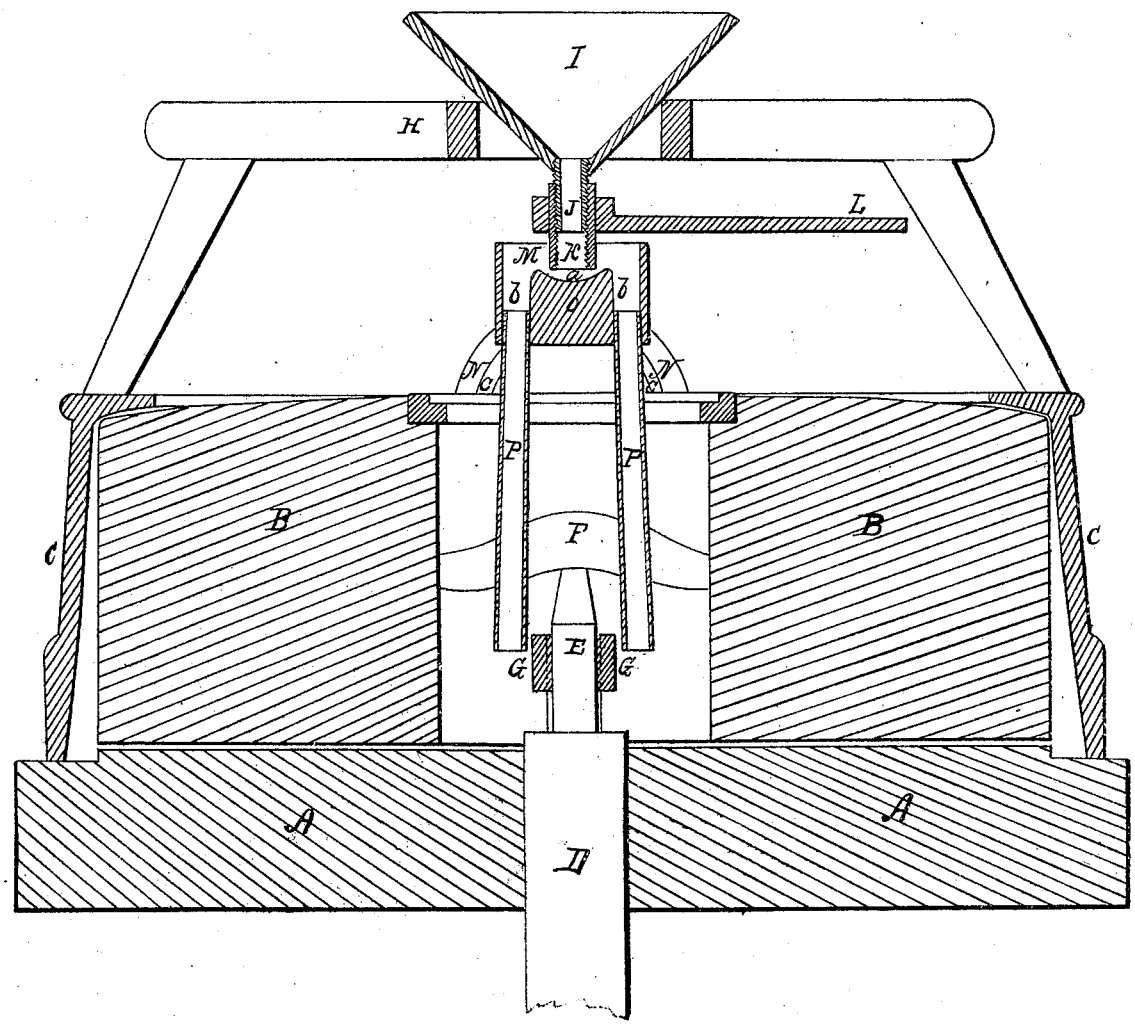

Figure 1, represents a perspective view of the device in question, and Fig. 2, represents a central vertical section through the feeding apparatus and the burs.

Similar letters of the alphabet, where they occur in the separate figures, denote like parts in both.

To enable others skilled in the art to make and use my invention, I will proceed to describe the same with reference to the drawings.

A, represents a bed stone, B, a top stone or runner, and C, a curb, which may be made in any of the usual well known ways.

D, is the shaft, for giving motion to the runner B. The spindle E, on top of said shaft, supports by a bail F, the said runner, and a brace G, having a square hole through it, through which the square part of the spindle passes, gives motion to the runner said brace being united to the runner.

H, is a frame resting upon the curb, and standing over the central portion, or eye of the stone. On this frame is supported a hopper I, into which the grain to be ground may be conducted from the garner. A tube J, projects from the underside of the hopper, which has a screw thread cut upon it, and over this tube runs another tube K, to which a lever L, is connected, so that the outer tube K may be run up or down over the inner one J. A cup M, is supported on the runner, immediately over the eye of the stone, by legs N, and is sufficiently high to receive within it the lower end of the tube K, and within this cup, so as to leave a recess $b$ all around it, is placed a distributing block O, which has at its top a concave recess $a$. From the recess $b$, may lead any suitable number of conducting tubes P, which extend down near to the bottom of the runner for conveying the grain down through the eye of the stone to the grinding surfaces.

The operation of the feeding apparatus is as follows: The tube K, is raised just far enough above the block O, to admit the regulated quantity of grain which falls into the recess $a$, on top of the block O. Now the block O, being attached to the runner, has impartetd to it a high velocity, and the centrifugal force arising therefrom, causes the grain to pass over the edges of the block, and falling into the recess $b$, it is conveyed down by the tubes P, to near the bottom of the runner, where it is equally distributed, the feeding tubes also rotating with the runner. The object gained is greater regularity of feed, and an entire prevention of the clogging of the grain in the eye of the stone, by which the feed is at times stopped, and then over fed. The feeding apparatus is so connected to the burs, as that it can be instantly and entirely removed, when it becomes necessary to raise the runner for dressing or any other purpose. Small wings $c$, $c$, may be formed on the legs N, or any other rotating part of the apparatus for forcing a current of air down through the eye of the stone which current may aid to draw down the grain, as well as to cool the flour.

Having thus fully described the nature of my invention what I claim therein as new and desire to secure by Letters Patent, is—

The combination of the cup M, adjusting tube K, block O, and pipes or tubes P, leading far down into the eye of the runner, and used in connection with the draft of air, the whole forming a feeding device and operating substantially in the manner and for the purpose set forth.

M. H. FERGUSON.

Witnesses:
WM. J. WOODSIDE,
A. B. STOUGHTON.